US010250912B2

United States Patent
Cheng et al.

(10) Patent No.: US 10,250,912 B2
(45) Date of Patent: Apr. 2, 2019

(54) METHOD AND APPARATUS FOR ENTROPY DECODING WITH ARITHMETIC DECODING DECOUPLED FROM VARIABLE-LENGTH DECODING

(71) Applicant: MEDIATEK INC., Hsin-Chu (TW)

(72) Inventors: Chia-Yun Cheng, Hsinchu County (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 520 days.

(21) Appl. No.: 15/016,221

(22) Filed: Feb. 4, 2016

(65) Prior Publication Data

US 2016/0241854 A1 Aug. 18, 2016

Related U.S. Application Data

(60) Provisional application No. 62/117,101, filed on Feb. 17, 2015.

(51) Int. Cl.
*H04N 19/91* (2014.01)

(52) U.S. Cl.
CPC .................................. *H04N 19/91* (2014.11)

(58) Field of Classification Search
CPC ........ H04N 19/13; H04N 19/44; H04N 19/91; H04N 19/48; H04N 19/176; H04N 19/436; H04N 19/895
USPC .................................................... 375/240.23
See application file for complete search history.

(56) References Cited

U.S. PATENT DOCUMENTS

| 2005/0265449 | A1* | 12/2005 | Yoon ................... | H04N 21/8451 375/240.12 |
| 2006/0071829 | A1* | 4/2006 | Pearlstein ............... | H03M 7/40 341/67 |
| 2011/0228858 | A1* | 9/2011 | Budagavi ............... | H04N 19/70 375/240.25 |
| 2012/0177300 | A1* | 7/2012 | Sasai ...................... | H04N 19/13 382/233 |

(Continued)

FOREIGN PATENT DOCUMENTS

| CN | 1875545 A | 12/2006 |
| CN | 101072349 A | 11/2007 |

(Continued)

*Primary Examiner* — Neil R Mikeska
(74) *Attorney, Agent, or Firm* — Winston Hsu (57) ABSTRACT

An apparatus is capable of achieving high-throughput entropy decoding, and includes an arithmetic decoding processing circuitry and a variable-length decoder (VLD). The arithmetic decoding processing circuitry receives a video bitstream through a bitstream input, applies arithmetic decoding to at least a portion of the video bitstream to derive one or more arithmetic-decoded binary strings containing no arithmetic encoded binary string, and stores the arithmetic-decoded binary strings in the storage device. The variable-length decoder is coupled to the arithmetic decoding processing circuitry, the storage device and a VLD output. The variable-length decoder receives at least a portion of arithmetic-decoded bitstream when arithmetic-decoded bitstreams stored in the storage device are complete for a selected image unit, decodes at least a portion of arithmetic-decoded bitstream into one or more decoded syntax elements, and provides the decoded syntax elements through the VLD output.

20 Claims, 7 Drawing Sheets

(56) References Cited

U.S. PATENT DOCUMENTS

| | | | |
|---|---|---|---|
| 2012/0308148 A1* | 12/2012 | Kim | ...................... H04N 19/00 |
| | | | 382/233 |
| 2013/0136179 A1* | 5/2013 | Lim | .................... H04N 19/176 |
| | | | 375/240.13 |
| 2013/0336388 A1* | 12/2013 | Terada | ................... H04N 19/91 |
| | | | 375/240.03 |
| 2014/0286437 A1 | 9/2014 | He | |
| 2014/0301445 A1* | 10/2014 | Sasai | ..................... H04N 19/13 |
| | | | 375/240.02 |

FOREIGN PATENT DOCUMENTS

| CN | 101146230 A | 3/2008 |
|---|---|---|
| CN | 103563381 A | 2/2014 |

\* cited by examiner

METHOD AND APPARATUS FOR ENTROPY DECODING WITH ARITHMETIC DECODING DECOUPLED FROM VARIABLE-LENGTH DECODING

CROSS REFERENCE TO RELATED APPLICATIONS

The present invention claims priority to U.S. Provisional Patent Application Ser. No. 62/117,101, filed on Feb. 17, 2015. The U.S. Provisional Patent Application is hereby incorporated by reference in its entirety.

FIELD OF THE INVENTION

The present invention relates to entropy decoder for compressed data. In particular, the present invention relates high-throughput arithmetic decoding design for entropy coded bitstream generated from arithmetic coding.

BACKGROUND

Video data requires a lot of storage space to store or a wide bandwidth to transmit. Along with the growing high resolution and higher frame rates, the storage or transmission bandwidth requirements would be formidable if the video data is stored or transmitted in an uncompressed form. Therefore, video data is often stored or transmitted in a compressed format using video coding techniques. The coding efficiency has been substantially improved using newer video coding standard such as H.264/AVC and the emerging HEVC (High Efficiency Video Coding) standard. In order to maintain manageable complexity, an image is often divided into blocks, such as macroblock (MB) or LCU/CU to apply video coding. Video coding standards usually adopt adaptive Inter/Intra prediction on a block basis.

Figure 1:
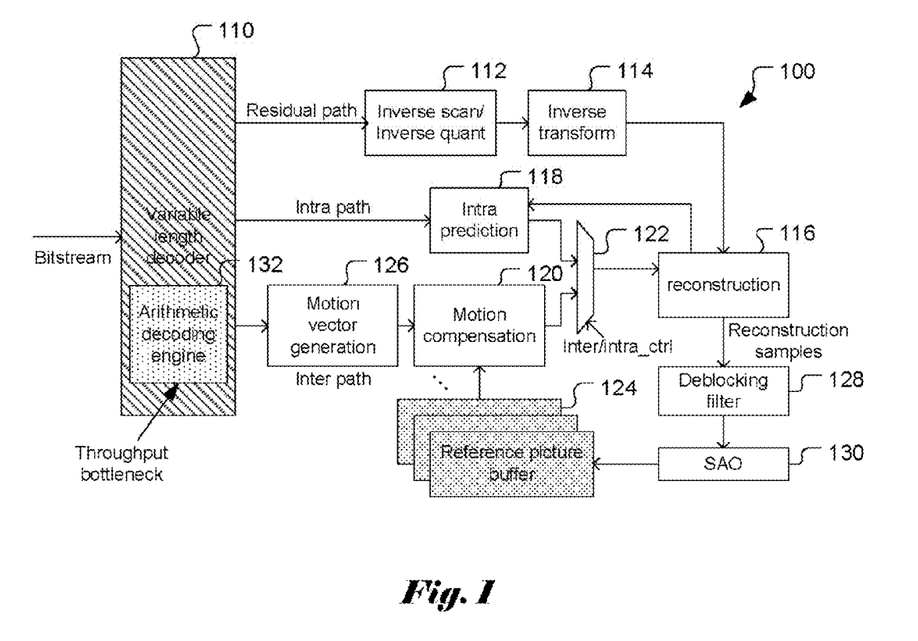
FIG. 1 illustrates an exemplary system block diagram for video decoder to support HEVC (High Efficiency Video Coding) video standard

FIG. 1 illustrates an exemplary system block diagram for video decoder 100 to support HEVC video standard. High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block. A CU may begin with a largest CU (LCU), which is also referred as coded tree unit (CTU) in HEVC and each CU can be recursively split into four smaller CUs until the predefined minimum size is reached. Once the splitting of CU hierarchical tree is done, each CU is further split into one or more prediction units (PUs) according to prediction type and PU partition. Each CU or the residual of each CU is divided into a tree of transform units (TUs) to apply two-dimensional (2D) transforms.

In FIG. 1, the input video bitstream is first processed by variable length decoder (VLD) 110 to perform variable-length decoding and syntax parsing. The parsed syntax may correspond to Inter/Intra residue signal (the upper output path from VLD 110) or motion information (the lower output path from VLD 110). Among the entropy coded bitstream, some bins may be coded by arithmetic coding. The arithmetic coded bins will need an arithmetic decoder to recover the coded data. As shown in FIG. 1, an arithmetic decoding engine 132 is used as part of the entropy decoding engine 110. Furthermore, the operations for arithmetic decoding are usually more complicated than other types of entropy decoding, such as variable length coding. Therefore, the arithmetic decoding may be relatively slow compared to other decoding process and becomes a throughput bottleneck. The residue signal usually is transform coded. Accordingly, the coded residue signal is processed by inverse scan (IS)/inverse quantization (IQ) block 112, and inverse transform (IT) block 114. The output from inverse transform (IT) block 114 corresponds to reconstructed residue signal. The reconstructed residue signal is added to reconstruction block 116 along with Intra prediction from Intra prediction block 118 for an Intra-coded block or Inter prediction from motion compensation block 120 for an Inter-coded block. Inter/Intra selection block 122 selects Intra prediction or Inter prediction for reconstructing the video signal depending on whether the block is Inter or Intra coded. For motion compensation, the process will access one or more reference blocks stored in decoded picture buffer or reference picture buffer 124 and motion vector information determined by motion vector (MV) generation block 126. In order to improve visual quality, deblocking filter 128 and Sample Adaptive Offset (SAO) filter (130) are used to process reconstructed video before it is stored in the decoded picture buffer 124. For the H.264/AVC standard, only the deblocking filter (DF) is used without the sample adaptive offset (SAO) filter.

Figure 2:
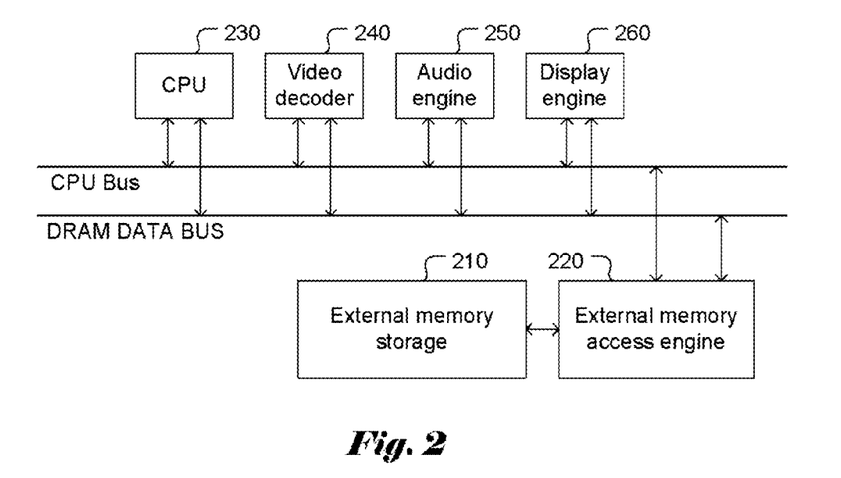
FIG. 2 illustrates a typical TV system with built-in audio/video decoder.

FIG. 2 illustrates a typical electronic system with built-in audio/video decoder, such as a TV. As shown in FIG. 2, the system uses a CPU bus and DRAM (dynamic random access memory) bus, where the CPU bus is used for CPU command and communication in order to control other modules. The external memory storage (210) is used to store reference pictures for video decoding, decoded pictures for display and other data. The external memory often uses DRAM (dynamic random access memory) and external memory access engine (220) is used to connect the external memory storage to the data bus. The system may include a CPU (230), a video decoder (240), an audio engine (250) and a display engine (260). The video decoder 240 will perform the task of video decoding for compressed video data. The audio engine 250 will perform the task of audio decoding for compressed audio data. The audio engine 250 may also support other audio tasks such as generating audio prompt for user interface. The display engine 260 is responsible for processing video display and generating on-screen display information. For example, the display engine 260 may generate graphic or text information for user interface. The display engine is also responsible for scaling and combining two decoded video data for main window and sub-window display, or split screen display. The CPU 230 may be used to initialize the system, control other sub-systems, or provide user interface for the electronic system.

Figure 3:
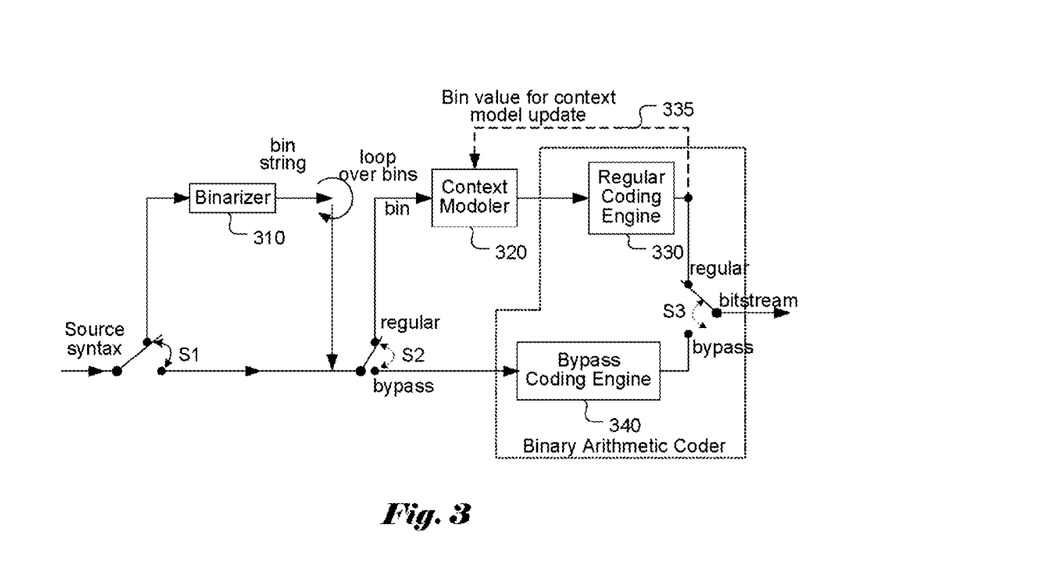
FIG. 3 illustrates an exemplary block diagram of the context-based adaptive binary arithmetic coding (CABAC) process.

While arithmetic coding is high-efficiency entropy-coding tool and has been widely used in advanced video coding systems, the operations are highly data dependent. FIG. 3 illustrates an exemplary block diagram of the context-based adaptive binary arithmetic coding (CABAC) process. Since the arithmetic coder in the CABAC engine can only encode the binary symbol values, the CABAC process needs to convert the values of the syntax elements into a binary string using a binarizer (310). The conversion process is commonly referred to as binarization. During the coding process, the probability models are gradually built up from the coded symbols for the different contexts. The context modeler (320) serves the modelling purpose and the model is updated using decoded output data. Accordingly, a path 335 from the output of regular coding engine (330) to the context modeler (320) is provided. During normal context based coding, the regular coding engine (330) is used, which corresponds to a binary arithmetic coder. The selection of the modeling context for coding the next binary symbol can be determined by the coded information. Symbols can also be encoded without the context modeling stage and assume an equal probability distribution, commonly referred to as the bypass mode, for reduced complexity. For the bypassed symbols, a bypass coding engine (340) may be used. As shown in FIG. 3, switches (S1, S2 and S3) are used to direct the data flow between the regular CABA mode and the bypass mode. When the regular CABAC mode is selected, the switches are flipped to the upper contacts. When the bypass mode is selected, the switches are flipped to the lower contacts.

For arithmetic coding, the context formation and context update is highly data dependent. The context model may involve multiple neighboring reconstructed samples. Furthermore, the context update has to wait till the involved samples are available. The arithmetic decoder may become the throughput bottleneck in the decoding process. Therefore, it is desirable to develop high-throughput arithmetic decoder.

SUMMARY

An apparatus and method for high-throughput entropy decoding in a video decoder are disclosed. The apparatus comprises an arithmetic decoding processing circuitry and a variable-length decoder (VLD). The arithmetic decoding processing circuitry is coupled to a bitstream input and a storage device. The arithmetic decoding processing circuitry receives a video bitstream through the bitstream input, applies arithmetic decoding to at least a portion of the video bitstream to derive one or more arithmetic-decoded binary strings containing no arithmetic encoded binary string, and stores said one or more arithmetic-decoded binary strings in the storage device. The variable-length decoder (VLD) is coupled to the arithmetic decoding processing circuitry, the storage device and a VLD output. The variable-length decoder receives at least a portion of arithmetic-decoded bitstream when arithmetic-decoded bitstreams stored in the storage device are complete for a selected image unit, decodes at least a portion of arithmetic-decoded bitstream into one or more decoded syntax elements, and provides the decoded syntax elements through the VLD output.

The arithmetic decoding processing circuitry may comprise a context bin decoder and a context model update processing circuitry, where the context bin decoder is arranged to perform context-based decoding to generate one or more decoded bins based on a context model, and the context model update processing circuitry is arranged to update the context model according to said one or more decoded bins. The arithmetic decoding processing circuitry is coupled to a context table storage and neighbor data storage to obtain context information required for said context-based decoding. The variable-length decoder comprises one or more VLD engines for decoding one or more respective VLD codes. The VLD engines may include Huffman decoding engine, Unary decoding engine and Exp-Golomb decoding engine. To further improve the throughput, the arithmetic decoding processing circuitry may comprise multiple arithmetic decoding processing circuitries arranged to operate in parallel.

The entropy decoder may further comprise an error-checking circuitry capable of checking any error in the arithmetic-decoded bitstream stored in the storage device for the selected image unit. The error-checking circuitry can provide the error information to a subsequent video decoder for error handling if any error is detected.

The arithmetic decoding module and the variable-length decoder can be arranged to perform pipelined arithmetic decoding and variable-length decoding on selected image units concurrently. The parallel processing can be applied to image units corresponds to coding tree units (CTUs) or macroblocks (MBs).

These and other objectives of the present invention will no doubt become obvious to those of ordinary skill in the art after reading the following detailed description of the preferred embodiment that is illustrated in the various figures and drawings.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The arithmetic coding is often applied to bit strings generated after prediction and/or quantization. Also, various coding parameters and system configuration information may have to be transmitted. These coding parameters and system configuration information will be binarized into binary strings. The arithmetic coded bitstream is then processed using binarization process according to selected binary codes such as Unary, Huffman codes and Golomb codes. The arithmetic coding usually is applied to binary strings associated with certain syntax elements such as motion vector difference (MVD), partition mode for CU, sign and absolute value of quantized transform coefficients of prediction residual, etc.

Figure 4:
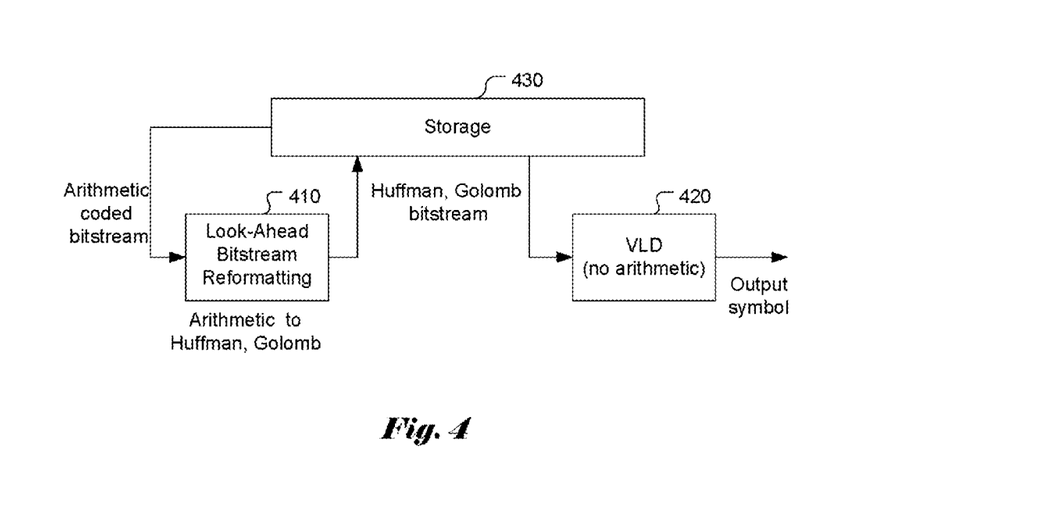
FIG. 4 illustrates architecture of an exemplary entropy decoder according to the present invention, where the arithmetic decoder comprises a look-ahead bitstream reformatting processing circuitry and variable length decoder that are coupled to a storage device.

FIG. 4 illustrates architecture of an exemplary arithmetic decoder according to the present invention. The arithmetic decoder comprises a look-ahead bitstream reformatting processing circuitry 410, variable length decoder (VLD) 420 and storage 430. As shown in FIG. 4, an arithmetic coded bitstream from storage is provided to the look-ahead bitstream reformatting processing circuitry 410, which is a arithmetic decoding processing circuitry. The arithmetic coded bitstream is then arithmetic decoded to recover a binary string that is already arithmetic-decoded binary string. This arithmetic-decoded binary string is also referred as a non-arithmetic binary string or an intermediate binary string. The arithmetic-decoded binary string is then stored in storage 430. When enough arithmetic-decoded binary strings have been buffered in storage 430, the non-arithmetic binary string is then read out from storage 430 and decoded by variable length decoder (VLD) 420. The variable length decoder (VLD) 420 will decode the non-arithmetic binary string into coding symbols representing prediction residual, various coding parameters and system configuration information. The decoded symbols will be provided to other processing modules in a decoder to reconstruct the video data.

As mentioned before, the arithmetic coding process is very data dependent and often causes decoding throughput concern. In order to overcome this issue, the present invention decouples the arithmetic decoding from the VLD process by storing the non-arithmetic encoded bitstream from the arithmetic decoder in storage. When enough non-arithmetic encoded bitstream has been buffered, such for a complete unit such as CTU, MB, CTU row, MB row, slice, or picture, the non-arithmetic encoded bitstream for the complete unit such as CTU/MB is read out from the storage and decoded by the VLD 420. Since the variable length decoder (VLD) 420 is relatively simple compared to the arithmetic decoder, the system design only needs to focus on the throughput issue for the arithmetic decoder. When needed, the arithmetic decoding module may use multiple arithmetic decoders to operate in parallel to increase the processing speed.

In FIG. 4, the arithmetic-decoded binary string from the look-ahead bitstream reformatting processing circuitry 410 stores and uses as context for arithmetic decoding of subsequent data in the input binary string. The storage for context information may share the same storage 430 or use separate storage. For variable length decoder (VLD) 420, it receives inputs from the storage when enough non-arithmetic encoded bitstream is available. FIG. 4 illustrates the main components required to implement arithmetic decoder according to an embodiment of the present invention. Some of the key components may be shared with other circuits or modules in a system. For example, storage 430 may be a shared resource for a system, where other data such as the binary string to be decoded and the arithmetic-decoded binary string may be stored in storage 430. The look-ahead bitstream reformatting processing circuitry 410 and variable length decoder (VLD) 420 may be implemented as separate module or modules. The look-ahead bitstream reformatting processing circuitry 410 and variable length decoder (VLD) 420 may also be embedded within a video decoder. For example, both look-ahead bitstream reformatting processing circuitry 410 and variable length decoder (VLD) 420 may be embedded within a video decoder. Alternatively, variable length decoder (VLD) 420 may be embedded within a video decoder while the look-ahead bitstream reformatting processing circuitry 410 may be a separate module. Furthermore, while input bitstream to the Look-Ahead Bitstream Reformatting 410 is from the storage 430 as shown in FIG. 4, the input bitstream may be from separate system storage or from an output of other process in the system.

Figure 5:
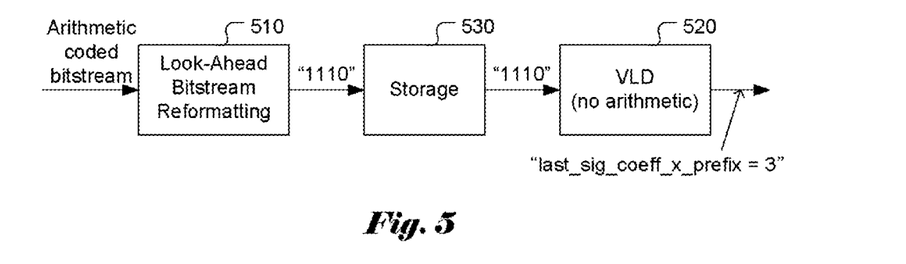
FIG. 5 illustrates an example of entropy decoding process according to an embodiment of the present invention, where the arithmetic coded bitstream is processed by the look-ahead bitstream reformatting processing circuitry, stored in storage and decoded using VLD to recover coded syntax.

For example, in HEVC standard, syntax element last_sig_coeff_x_prefix specifies the prefix of the column position of the last significant coefficient in a scanning order within a transform block. According to the HEVC standard, syntax element last_sig_coeff_x_prefix is arithmetic coded. Unary codes may be used for binarization of syntax element last_sig_coeff_x_prefix. An exemplary unary code for syntax element last_sig_coeff_x_prefix is shown in Table 1, where a longest code has 6 bits and the bin location is indicated by binIdx. At the encoder side, the prefix values for the column position of the last significant coefficient in scanning order are binarized into respective bin strings. For example, the prefix value equal to 3 is binarized into "1110". The binarized bin strings are further coded using arithmetic coding. According to an embodiment of the present invention, the arithmetic coded bitstream is processed by the look-ahead bitstream reformatting processing circuitry 510 at the decoder side as shown in FIG. 5. The arithmetic-decoded bin string "1110" from the look-ahead bitstream reformatting processing circuitry 510 will be stored in the storage 530. After enough bin strings for an image unit (e.g., a CTU or MB) are available, the stored bin string "1110" is then provided to VLD 520 to recover the coded syntax, i.e., last_sig_coeff_x_prefix with a value of 3.

TABLE 1

| prefixVal | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

Figure 6:
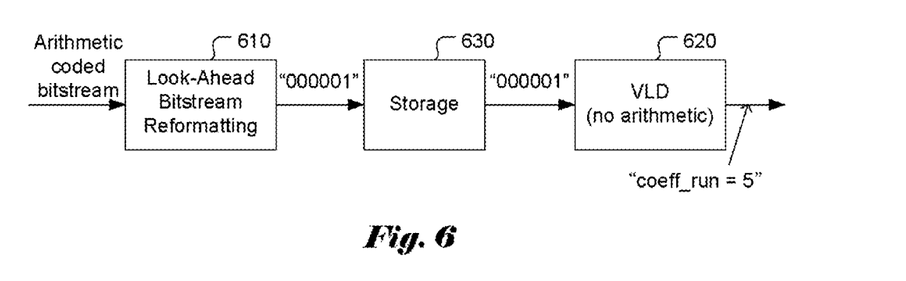
FIG. 6 illustrates another example of entropy decoding process according to an embodiment of the present invention, where the arithmetic coded bitstream is processed by the look-ahead bitstream reformatting processing circuitry, stored in storage and decoded using VLD to recover coded syntax.

In another example, a syntax element value (i.e., synElVal) for the AVS2 standard is converted into a binary string using Unary code as shown in Table 2. For example, the syntax element value equal to 5 is binarized into "000001". The binarized bin strings are further coded using arithmetic coding. According to an embodiment of the present invention, the arithmetic coded bitstream is processed by the look-ahead bitstream reformatting processing circuitry 610 at the decoder side as shown in FIG. 6. The arithmetic-decoded bin string "000001" from the look-ahead bitstream reformatting processing circuitry 610 will be stored in the storage 630. The stored bin string "000001" is then provided to VLD 620 to recover the coded syntax, i.e., synElVal with a value of 5.

TABLE 2

| synElVal | Bin string | | | | | | | |
|---|---|---|---|---|---|---|---|---|
| 0 | 1 | | | | | | | |
| 1 | 0 | 1 | | | | | | |
| 2 | 0 | 0 | 1 | | | | | |
| 3 | 0 | 0 | 0 | 1 | | | | |
| 4 | 0 | 0 | 0 | 0 | 1 | | | |
| 5 | 0 | 0 | 0 | 0 | 0 | 1 | | |
| ... | 0 | 0 | 0 | 0 | 0 | 0 | ... | |
| maxVal-1 | 0 | 0 | 0 | 0 | 0 | 0 | ... | 1 |
| maxVal | 0 | 0 | 0 | 0 | 0 | 0 | ... | 0 |
| binIdx | 0 | 1 | 2 | 3 | 4 | 5 | ... | maxVal-1 |

Figure 7:
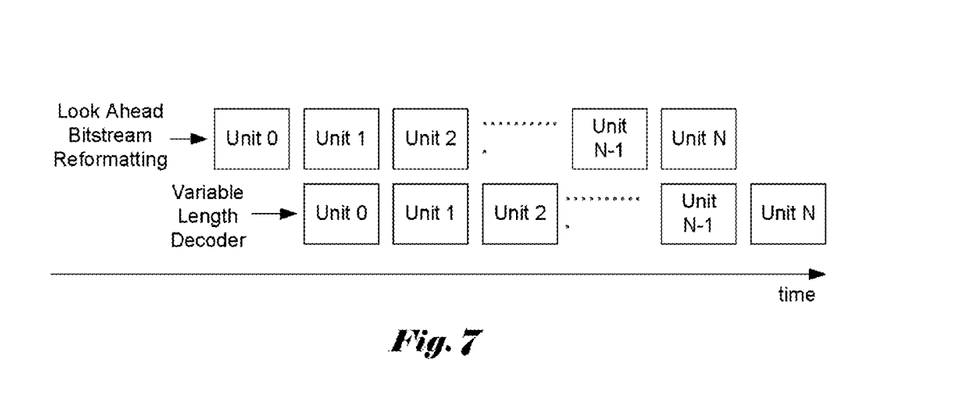
FIG. 7 illustrates an example of parallel processing pipeline using the entropy decoder architecture incorporating an embodiment of the present invention by applying the entropy decoding process to image units corresponding to pictures, slices, coding tree unit (CTU) row, macroblock (MB) row, CTUs, MBs, coding units (CUs) or blocks.

The entropy decoder architecture with partitioned arithmetic decoding function and VLD decoding function provides an advantage of efficient parallel processing. After arithmetic decoding, the remaining entropy decoding function relies on the VLD module only. Accordingly, parallel pipeline processing can be arranged based on the entropy decoder architecture incorporating an embodiment of the present invention. FIG. 7 illustrates an example of parallel processing pipeline using the entropy decoder architecture incorporating an embodiment of the present invention. The parallel processing can be applied to image units of the video data. Each image unit may correspond to a picture, a slice, a macroblock (MB)/coding tree unit (CTU) row, a MB/CTU, or a block/coding unit (CU). Other processing unit may also be used. After a current unit is arithmetic decoded by the look-ahead bitstream reformatting processing circuitry, the current unit is proved to the VLD for subsequent VLD decoding to recover the coded syntax and a next unit is provide to the look-ahead bitstream reformatting processing circuitry. Therefore, the arithmetic decoding of the next unit and the VLD decoding of the current unit may occur concurrently or overlapped.

Figure 8:
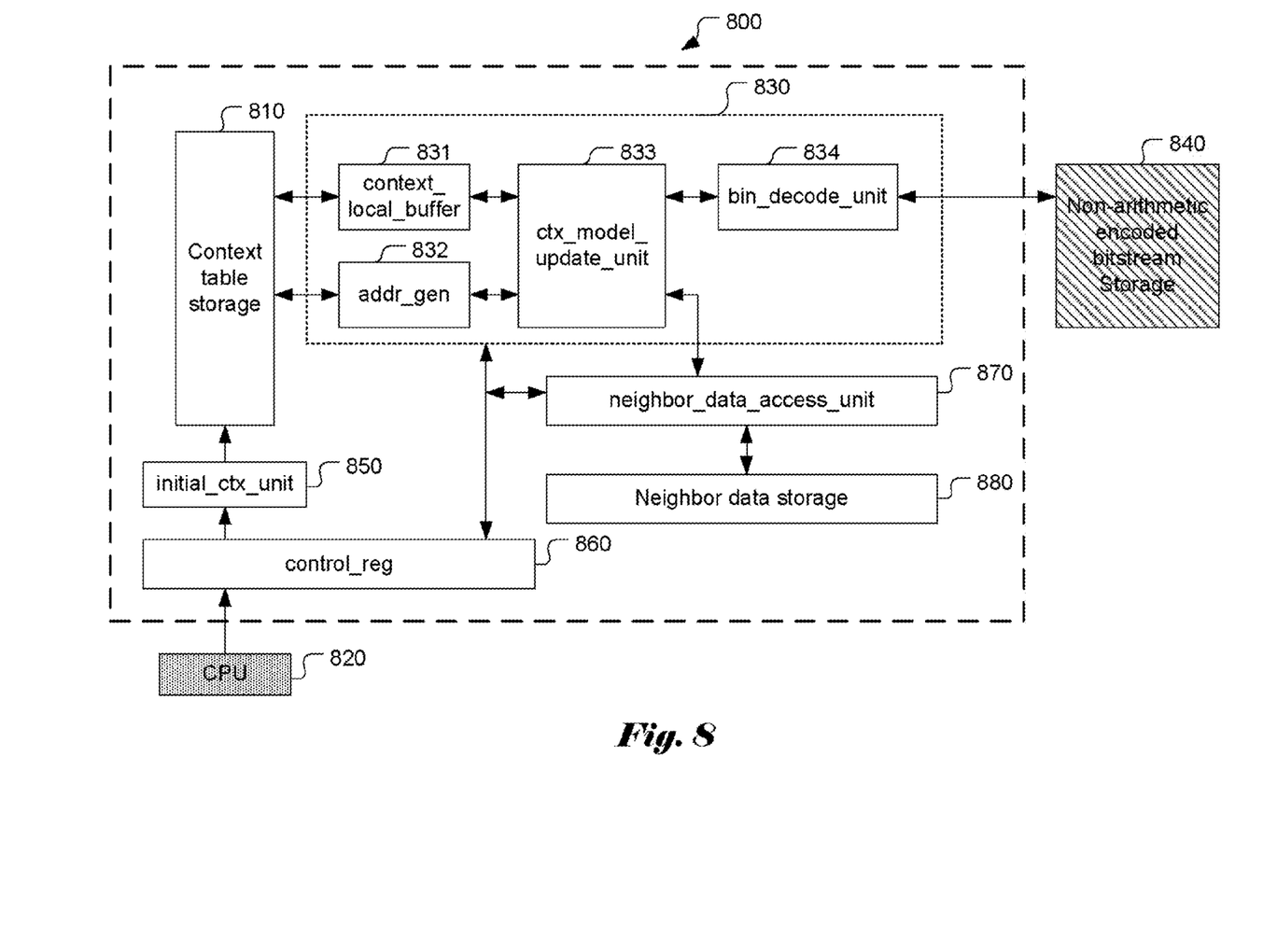
FIG. 8 illustrates an example of more detailed structure of look-ahead bitstream reformatting processing circuitry.

FIG. 8 illustrates an example of more detailed structure of look-ahead bitstream reformatting processing circuitry 800. Block 830 represents the bin decoder and its output is provided to storage for non-arithmetic coded bitstream 840 for further decoding processing. The control register 860 provides decoding information to bin decoder 830 and neighbor data access unit 870. On the other hand, the neighbor data access unit 870 is connected to neighbor data storage 880 and context model update unit or context model update processing circuitry 833 in order to provide needed neighbor data for context model update. The CPU 820 is connected to the control register 860 to store the decoding information for the bin decoders. The CPU may be a shared resource for the video decoder. Alternatively, a dedicated smaller processor may be used as part of the look-ahead bitstream reformatting processing circuitry 800. The control register 860 provides initial context information to the initial context unit 850 and the initial context will be stored in the context table storage 810.

In FIG. 8, the context table storage 810 and neighbor data storage 880 may be implemented as on-chip buffer to support the required high-speed and efficient data access. On the other hand, the storage for non-arithmetic coded bitstream 840 may be based on off-chip storage such as DRAM (dynamic random access memory) due to the cost concern.

The bin decoder 830 includes a context local buffer 831, address generator 832, context model update unit 833, and bin decode unit 834. The address generator 832 will generate address for context table storage. The context model update unit 833 is used to generate new context model and update context model stored in context local buffer 831 during bin decoding. The bin decode unit 834 performs the task of binary arithmetic decoding or bypass decoding using the updated context model from the context model update unit 833. The decoded output from the bin decode unit 833 will be stored in the storage for non-arithmetic coded bitstream 840 for further decoding process. The detailed structure for the look-ahead bitstream reformatting processing circuitry in FIG. 8 is intended to illustrate an example according to the present invention. A person skilled in the art may similar structure to implement the invention without departing from the spirit of the present invention.

Figure 9:
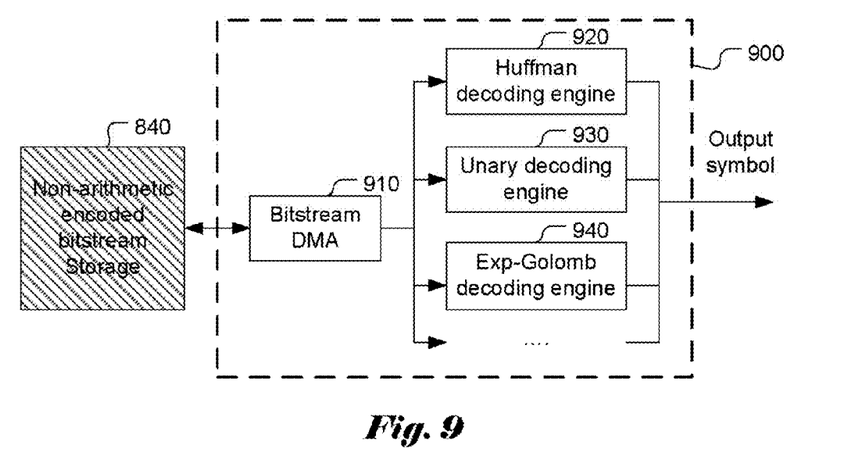
FIG. 9 illustrates an example of the VLD module comprising multiple VLD decoding engines for decoding non-arithmetic binary string according to an embodiment of the present invention.

FIG. 9 illustrates an example of the VLD 900 for non-arithmetic binary string according to an embodiment of the present invention. The arithmetic-decoded binary string from the look-ahead bitstream reformatting processing circuitry does not include any arithmetic coded data so that the binary string can be decoded using VLD. The VLD 900 comprises bitstream DMA 910 (direct memory access) for fast access to non-arithmetic coded bitstream stored in storage 840. The coded syntax elements within the non-arithmetic binary string may be coded by various variable length codes, such as Huffman code, Unary code, Exp-Golomb code, etc. Therefore, the non-arithmetic binary string will be provided to a corresponding Huffman decoding engine 920, Unary decoding engine 930, Exp-Golomb decoding engine 940, etc. Each decoding engine will recover coded syntax elements respectively. The output syntax may be stored in a buffer/memory for subsequent processing or be provided to other processors in a video decoder.

Figure 10:
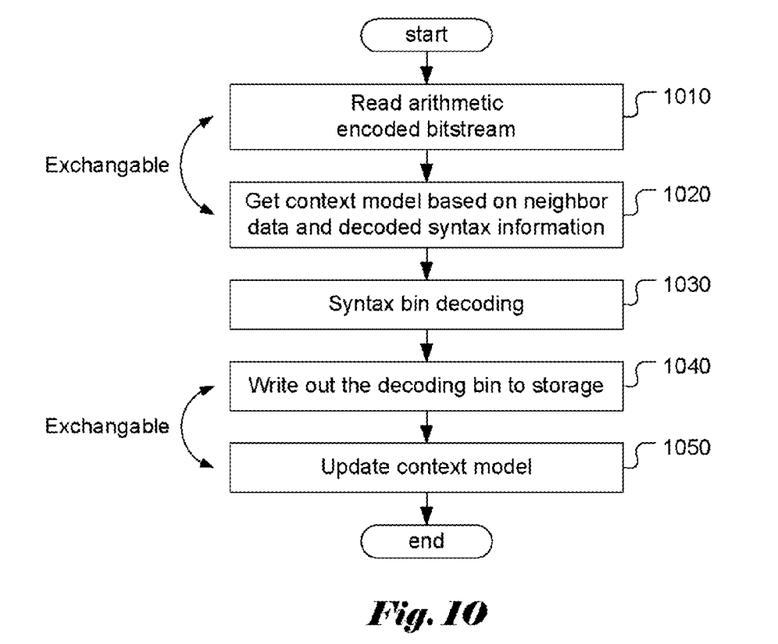
FIG. 10 illustrates an exemplary flowchart for the processing of the look-ahead bitstream reformatting processing circuitry.

FIG. 10 illustrates an exemplary flowchart for the processing of the look-ahead bitstream reformatting processing circuitry. As shown in FIG. 10, arithmetic encoded bitstream is read into the look-ahead bitstream reformatting processing circuitry in step 1010. A portion of the arithmetic encoded bitstream instead of the whole bitstream is read each time. This is particular useful when the processing unit corresponds to a large processing area, such as a picture, a slice or a MB/CTU row. The context model based on neighbor data and decoded syntax information is generated in step 1020 in order to perform the syntax bin decoding in step 1030. The decoded syntax is written out to storage in step 1040. Since the context model depends on the decoded syntax, the decoded syntax is used to update the syntax model as shown in step 1050. The flowchart in FIG. 10 is intended to illustrate an example of arithmetic decoding process according to an embodiment of the present invention. A person skilled in the art may modify the processing steps to practice the present invention without departing from the spirit of the present invention. For example, steps 1010 and 1020 can be swapped. Also, steps 1040 and 1050 can be swapped as well.

Figure 11:
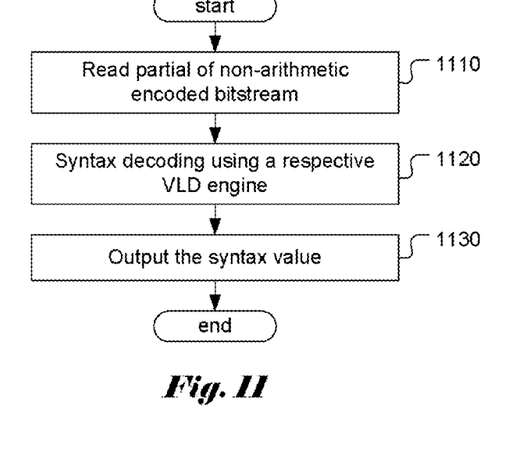
FIG. 11 illustrates an exemplary flowchart for the processing of the VLD module.

FIG. 11 illustrates an exemplary flowchart for the processing of the VLD. As shown in FIG. 11, non-arithmetic encoded bitstream is read into the VLD in step 1110. A portion of the non-arithmetic encoded bitstream instead of the whole bitstream may be read each time. This is particular useful when the processing unit corresponds to a large processing area, such as a picture, a slice or a MB/CTU row. Syntax decoding is then applied to the non-arithmetic encoded bitstream using a respective VLD engine in step 1120. The decoded syntax is then outputted as shown in step 1130. The flowchart in FIG. 11 is intended to illustrate an example of VLD decoding process according to an embodiment of the present invention.

Figure 12:
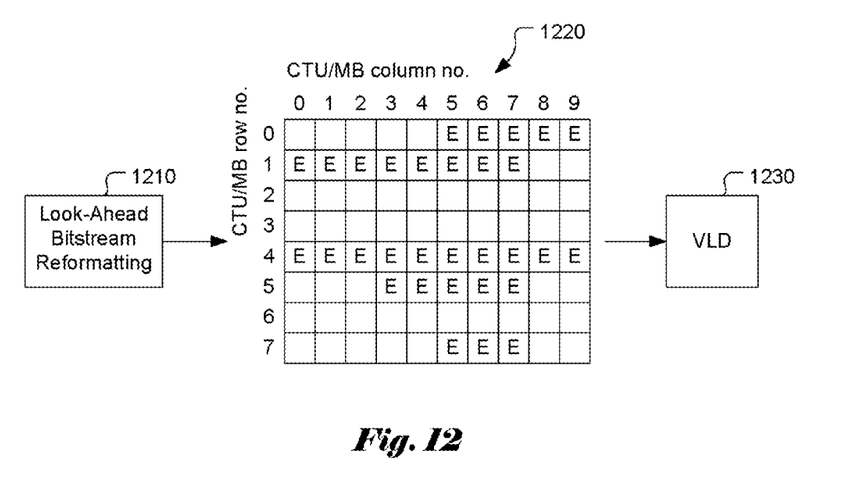
FIG. 12 illustrates an example of error detection for arithmetic-decoded bitstream for image units associate with a picture according to an embodiment of the present invention.

The present invention stores arithmetic-decoded bin strings in memory. In one embodiment, the system may take advantage of the stored arithmetic-decoded bin strings and detect possible errors in the arithmetic-decoded bin strings. The look-ahead bitstream reformatting processing circuitry parses the video bitstream for a partial picture, a picture or multiple pictures and stores the binary strings into memory before providing the binary strings for VLD process and subsequent video decoding process. If there is any error in the video bitstream, the error may be detected by the look-ahead bitstream reformatting processing circuitry and the syntax parser can record the error. For example, an error table can be used to record the error information in a picture. FIG. 12 illustrates an example incorporating an embodiment of the invention, where each image unit corresponds to a CTU or MB. The look-ahead bitstream reformatting processing circuitry 1210 parses the video bitstream and detects errors. The errors in the picture are recorded in an error table 1220. The arithmetic-decoded bitstream is provided to VLD 1230 for VLD decoding to recover syntax elements. The error information is provided to the subsequent video decoding process during decoding a CTU/MB row. If there is any error in the current CTU/MB being processed, the video decoder may apply error handling to the current CTU/MB.

Figure 13:
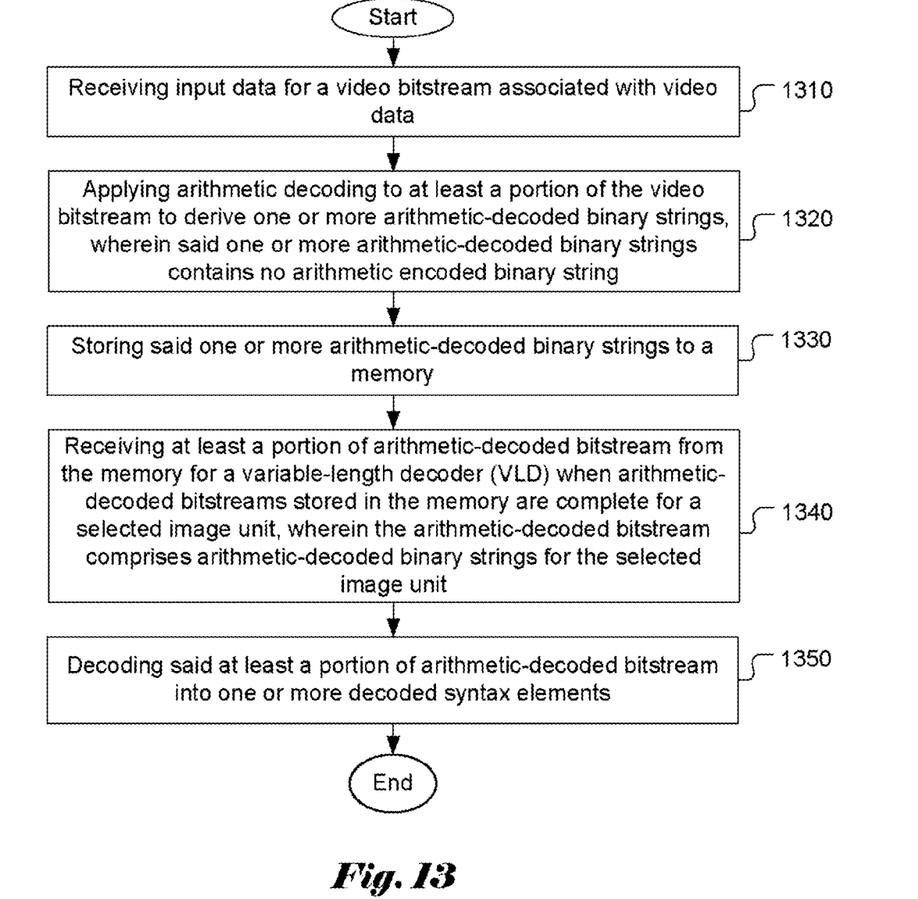
FIG. 13 illustrates an exemplary flowchart for an entropy decoder incorporating a look-ahead bitstream reformatting processing circuitry according to an embodiment of the present invention.

FIG. 13 illustrates an exemplary flowchart for an entropy decoder incorporating a look-ahead bitstream reformatting processing circuitry according to an embodiment of the present invention. The decoder receives input data for a video bitstream associated with video data in step 1310. Arithmetic decoding is applied to at least a portion of the video bitstream to derive one or more arithmetic-decoded binary strings in step 1320, where said one or more arithmetic-decoded binary strings contains no arithmetic encoded binary string. Said one or more arithmetic-decoded binary strings is stored in a memory in step 1330. At least a portion of arithmetic-decoded bitstream is received from the memory for a variable-length decoder (VLD) when arithmetic-decoded bitstreams stored in the memory are complete for a selected image unit in step 1340, where the arithmetic-decoded bitstream comprises arithmetic-decoded binary strings for the selected image unit. Said at least a portion of arithmetic-decoded bitstream is decoded into one or more decoded syntax elements in step 1350.

The flowchart shown is intended to illustrate an example of entropy decoding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The present invention discloses a high-throughput entropy decoder for arithmetic coded bin strings. The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A method of entropy decoding for binary strings coded using variable length coding and arithmetic coding, the method comprising:
   receiving input data for a video bitstream associated with video data;
   applying arithmetic decoding to at least a portion of the video bitstream to derive at least one arithmetic-decoded binary string, wherein said at least one arithmetic-decoded binary string contains no arithmetic encoded binary string;
   storing said at least one arithmetic-decoded binary string in a memory;
   receiving at least a portion of arithmetic-decoded bitstream from the memory for a variable-length decoder (VLD) when arithmetic-decoded bitstreams stored in the memory are complete for a selected image unit, wherein the arithmetic-decoded bitstream is variable-length encoded, and comprises arithmetic-decoded binary strings for the selected image unit; and
   applying variable-length decoding, by the variable-length decoder, to said at least a portion of arithmetic-decoded bitstream to derive said at least one decoded syntax element;
   wherein said arithmetic decoding is decoupled from the variable-length decoder via the memory; and a processing time of said variable-length decoding of one image unit overlaps a processing time of said arithmetic decoding of another image unit.

2. The method of claim 1, wherein said arithmetic decoding comprises performing context-based decoding to generate at least one decoded bin based on a context model and updating the context model according to said at least one decoded bin.

3. The method of claim 1, wherein the selected image unit corresponds to a picture, a slice, a macroblock row, a CTU (coding tree unit) row, a macroblock, a CTU, a CU (coding unit) or a block.

4. The method of claim 1, wherein the variable-length decoder is capable of decoding at least one VLD code.

5. The method of claim 4, wherein said at least one VLD code includes Huffman code, Unary code, or Exp-Golomb code.

6. The method of claim 1, wherein said arithmetic decoding is applied to said at least a portion of the video bitstream uses multiple arithmetic decoding processing circuitries in parallel.

7. The method of claim 1, further comprising checking any error in the arithmetic-decoded bitstream stored in the memory for the selected image unit.

8. The method of claim 7, further comprising providing error information to a subsequent video decoder for error handling if any error is detected.

9. The method of claim 1, wherein an arithmetic decoding processing circuitry is used for said arithmetic decoding, and the arithmetic decoding processing circuitry and the variable-length decoder are arranged to perform pipelined arithmetic decoding and variable-length decoding on selected image units concurrently.

10. The method of claim 9, wherein each selected image unit corresponds to a coding tree unit (CTU) or a macroblock (MB).

11. An apparatus of entropy decoding for binary strings coded using variable length coding and arithmetic coding, comprising:

an arithmetic decoding processing circuitry coupled to a bitstream input and a storage device; wherein the arithmetic decoding processing circuitry receives a video bitstream through the bitstream input, applies arithmetic decoding to at least a portion of the video bitstream to derive at least one arithmetic-decoded binary string containing no arithmetic encoded binary string, and stores said at least one or more arithmetic-decoded binary string in the storage device; and a variable-length decoder (VLD) coupled to the arithmetic decoding processing circuitry, the storage device and a VLD output, wherein the variable-length decoder receives at least a portion of arithmetic-decoded bitstream when arithmetic-decoded bitstreams stored in the storage device are complete for a selected image unit, applies variable-length decoding to said at least a portion of arithmetic-decoded bitstream to derive at least one decoded syntax element, and provides said at least one decoded syntax element through the VLD output;

wherein the arithmetic-decoded bitstream is variable-length encoded, and comprises arithmetic-decoded binary strings for the selected image unit; wherein the arithmetic decoding processing circuitry is decoupled from the variable-length decoder via the storage device; and a processing time of said variable-length decoding of one image unit overlaps a processing time of said arithmetic decoding of another image unit.

12. The apparatus of entropy decoding in claim 11, wherein the arithmetic decoding processing circuitry comprises a context bin decoder and a context model update processing circuitry, wherein the context bin decoder is arranged to perform context-based decoding to generate at least one decoded bin based on a context model, and the context model update processing circuitry is arranged to update the context model according to said at least one decoded bin.

13. The apparatus of entropy decoding in claim 12, wherein the arithmetic decoding processing circuitry is coupled to a context table storage and neighbor data storage to obtain context information required for said context-based decoding.

14. The apparatus of entropy decoding in claim 11, wherein the variable-length decoder comprises at least one VLD engine for decoding at least one VLD code.

15. The apparatus of entropy decoding in claim 14, wherein said at least one VLD engine includes Huffman decoding engine, Unary decoding engine, or Exp-Golomb decoding engine.

16. The apparatus of entropy decoding in claim 11, wherein the arithmetic decoding processing circuitry comprises multiple arithmetic decoders arranged to operate in parallel.

17. The apparatus of entropy decoding in claim 11, further comprising an error-checking circuitry capable of checking any error in the arithmetic-decoded bitstream stored in the storage device for the selected image unit.

18. The apparatus of entropy decoding in claim 17, wherein the error-checking circuitry provides error information to a subsequent video decoder for error handling if any error is detected.

19. The apparatus of entropy decoding in claim 11, wherein the arithmetic decoding processing circuitry and the variable-length decoder are arranged to perform pipelined arithmetic decoding and variable-length decoding on selected image units concurrently.

20. The apparatus of entropy decoding in claim 19, wherein each selected image unit corresponds to a pictures, slice, coding tree unit (CTU) row, macroblock (MB) row, CTU, MB, coding unit (CU) or block.

* * * * *